(12) United States Patent
Chang et al.

(10) Patent No.: US 7,069,320 B1
(45) Date of Patent: Jun. 27, 2006

(54) RECONFIGURING A NETWORK BY UTILIZING A PREDETERMINED LENGTH QUIESCENT STATE

(75) Inventors: Chun-Shi Chang, Poughkeepsie, NY (US); Dennis D. Jurgensen, Cary, NC (US); Orvalle T. Kirby, Raleigh, NC (US); Felipe Knop, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 606 days.

(21) Appl. No.: 09/411,515

(22) Filed: Oct. 4, 1999

(51) Int. Cl.
*G06F 15/173* (2006.01)

(52) U.S. Cl. ............. 709/225; 709/228; 709/221; 709/224; 370/452

(58) Field of Classification Search ........... 709/225, 709/227, 221, 224; 714/4, 47; 370/452, 370/318; 340/825.5
See application file for complete search history.

(56) References Cited

U.S. PATENT DOCUMENTS

| | | | | |
|---|---|---|---|---|
| 4,503,535 | A | * | 3/1985 | Budde et al. ............... 714/47 |
| 4,860,284 | A | * | 8/1989 | Brown et al. .............. 370/452 |
| 5,001,472 | A | * | 3/1991 | Fischer et al. ........... 340/825.5 |
| 5,088,091 | A | | 2/1992 | Schroeder et al. ......... 370/94.3 |
| 5,093,824 | A | | 3/1992 | Coan et al. .................. 370/16 |
| 5,247,381 | A | | 9/1993 | Olmstead et al. ........... 359/118 |
| 5,261,096 | A | | 11/1993 | Howarth .................... 395/650 |
| 5,390,351 | A | * | 2/1995 | Di Giulio et al. ........... 709/225 |
| 5,488,582 | A | | 1/1996 | Camarota ............... 395/189.05 |
| 5,751,967 | A | | 5/1998 | Raab et al. ............. 395/200.58 |
| 5,771,353 | A | * | 6/1998 | Eggleston et al. .......... 709/227 |
| 6,108,699 | A | * | 8/2000 | Moiin ......................... 709/221 |
| 6,192,388 | B1 | * | 2/2001 | Cajolet ....................... 709/100 |
| 6,192,483 | B1 | * | 2/2001 | Moiin et al. .................... 714/4 |
| 6,400,681 | B1 | * | 6/2002 | Bertin et al. ................ 370/218 |
| 6,532,494 | B1 | * | 3/2003 | Frank et al. ................ 709/224 |

OTHER PUBLICATIONS

"Unique Assignment of Link Weights," IBM Technical Disclosure Bulletin, R. A. Bodner, C. S. Chow, I. Cidon, J. E. Drake, E. A. Hervatic, S. Kutten, M. L. Peters, T. E. Tedijanto, IBM Publication No. RA892-0067, vol. 35, No. 6, Nov. 1992.

* cited by examiner

*Primary Examiner*—Patrice Winder
*Assistant Examiner*—Adnan M. Mirza
(74) *Attorney, Agent, or Firm*—Lawrence D. Cutter, Esq.; Kevin P. Radigan, Esq.; Heslin Rothenberg Farley & Mesiti, P.C.

(57) ABSTRACT

A network having a plurality of nodes is reconfigured to reflect a change in topology of the network. In particular, upon receiving a reconfiguration request, each node enters a quiescent state for a predetermined period of time sufficient to allow at least one other node to also enter a quiescent state. Then, upon termination of the quiescent state, the node is reconfigured to reflect the change in the topology of the network without having to check with any other nodes of the network. In other embodiments, the predetermined period of time is sufficient to allow currently executing protocols to complete execution as well as to allow the transmission of reconfiguration requests for propagating reconfiguration in the network.

52 Claims, 12 Drawing Sheets

RECONFIGURING A NETWORK BY UTILIZING A PREDETERMINED LENGTH QUIESCENT STATE

TECHNICAL FIELD

This invention relates, in general, to the reconfiguration of a network of a computing system. More particularly, this invention relates to reconfiguring a network having a plurality of nodes to reflect a change in topology of the network by utilizing a predetermined length quiescent state.

BACKGROUND ART

Typically, a distributed computing environment or computing system includes a number of processors or nodes interconnected to one another via one or more links to form a system of networks. This network of nodes is then able to process tasks concurrently in a manner which is more effective than with nodes processing individually.

In order to allow the nodes of these computing systems to process tasks in such a manner, monitoring systems are implemented within the computing systems to monitor the status of the nodes and their network adapters. These monitoring systems typically monitor the computing system for the failure or activation of nodes within the system. Thus, if a node or network adapter in such a computing system were to fail, the monitoring system would be responsible for identifying the failed node and for informing the remainder of the nodes of the failure.

From time to time, configuration changes are required to be implemented in computing systems operating under these monitoring systems due to, for example, the addition or deletion of computing resources (either individual nodes or entire networks of nodes) or due to, for example, address changes of network adapters. One possible procedure for implementing configuration changes requires the monitoring system to be deactivated and restarted only after the new configuration has been implemented. However, the deactivation of the monitoring system greatly inconveniences the subsystems relying on the monitoring system.

An alternate procedure is to implement configuration changes by performing a global synchronization. However, with a global synchronization each node in the computing system is required to be directly connected to each of the other nodes. Additionally, if the nodes in the computing system belong to different networks, a multiple hop communication is required for messages between some of the nodes. Furthermore, global synchronization also detrimentally interrupts any protocols running when reconfiguration is initiated.

As yet another alternative, nodes operating under the monitoring system may be reconfigured individually without deactivating the entire system. However, this procedure results in the danger of the transmission of messages from a node operating one configuration to nodes operating under another configuration, and because the contents of some messages are valid only when exchanged between nodes having the same view of the system, this procedure oftentimes leads to disastrous results.

In high availability systems, the above-mentioned disadvantages are unacceptable. Thus, a need exists for a reconfiguration protocol which allows reconfiguration without interruption to executing protocols. In addition, a further need exists for a reconfiguration protocol which implements a new configuration without requiring global synchronization.

SUMMARY OF THE INVENTION

The shortcomings of the prior art are overcome and additional advantages are provided through the provision of a method for reconfiguring a network having a plurality of nodes to reflect a change in topology of the network. In one example, the method includes: upon receiving a reconfiguration request at one node of said plurality of nodes, entering a quiescent state at said one node, wherein said one node remains in said quiescent state for a predetermined period of time sufficient to allow at least one other node of said plurality of nodes to also enter a quiescent state; and upon termination of said quiescent state at said one node, reconfiguring said one node to reflect said change in topology of said network without checking with said at least one other node.

In another embodiment, a system for reconfiguring a network having a plurality of nodes to reflect a change in topology of the network includes: means for entering, upon receiving a reconfiguration request at one node of said plurality of nodes, a quiescent state at said one node, wherein said one node remains in said quiescent state for a predetermined period of time sufficient to allow at least one other node of said plurality of nodes to also enter a quiescent state; and means for reconfiguring, upon termination of said quiescent state at said one node, said one node to reflect said change in topology of said network without checking with said at least one other node.

In yet another embodiment, another system for reconfiguring a network having a plurality of nodes to reflect a change in topology of the network includes: a computing node capable of, upon receiving a reconfiguration request at one node of said plurality of nodes, entering a quiescent state at said one node, wherein said one node remains in said quiescent state for a predetermined period of time sufficient to allow at least one other node of said plurality of nodes to also enter a quiescent state; said computing node further being capable of upon termination of said quiescent state at said one node, reconfiguring said one node to reflect said change in topology of said network without checking with said at least one other node.

In still yet another embodiment, an article of manufacture comprising a computer useable medium having computer readable program code means embodied therein for reconfiguring a network having a plurality of nodes to reflect a change in topology of the network includes: computer readable program code means for entering, upon receiving a reconfiguration request at one node of said plurality of nodes, a quiescent state at said one node, wherein said one node remains in said quiescent state for a predetermined period of time sufficient to allow at least one other node of said plurality of nodes to also enter a quiescent state; and computer readable program code means for reconfiguring upon termination of said quiescent state at said one node, said one node to reflect said change in topology of said network without checking with said at least one other node.

The reconfiguration capability of the present invention advantageously enables a network having a plurality of nodes to be reconfigured to reflect a change in topology of the network by utilizing a predetermined length quiescent state. In one embodiment, this predetermined period of time is sufficient to allow the transmission of reconfiguration requests from one node to other nodes of the network thereby causing the other nodes to also enter quiescent states. In another embodiment, this predetermined period of time is sufficient for protocols currently running on the network to complete execution. By utilizing this predetermined period of time, each node is able to exit from or terminate its quiescent state without having to check with or receive any communication from the other nodes of the network. Consequently, currently executing protocols are not interrupted and global synchronization is not required.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with the principles of the present invention, a network having a plurality of nodes is reconfigured to reflect a change in topology of the network by utilizing a predetermined length quiescent state. In one embodiment, this predetermined period of time is sufficient to allow the transmission of reconfiguration requests from one node to other nodes of the network thereby causing the other nodes to also enter quiescent states. In another embodiment, this predetermined period of time is sufficient for protocols currently running on the network to complete execution. By utilizing this predetermined period of time, each node is able to exit from or terminate its quiescent state without having to check with or receive any communication from the other nodes of the network.

Figure 1:
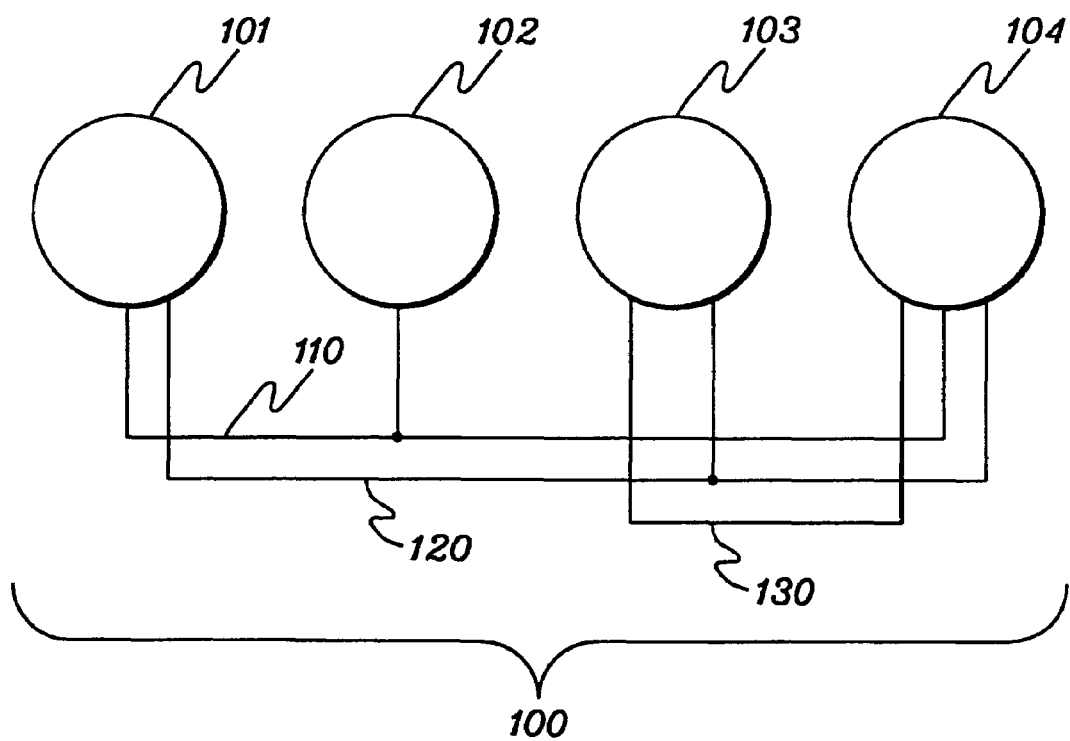
FIG. 1 depicts one example of a computing system incorporating and using a reconfiguring capability of the present invention.

FIG. 1 depicts one example of a distributed computing system incorporating the reconfiguring capability of the present invention. In one embodiment, a distributed computing system 100 includes a number of interconnected processors or nodes 101, 102, 103, and 104. Each of these nodes may be, for example, a RS/6000 offered by International Business Machines Corporation, or in the alternative each node may be a single processing node of a RS/6000 SP also offered by International Business Machines Corporation.

Nodes 101, 102, 103, and 104, in turn, are each bound to a network adapter, which may be, for example, an SP Switch adapter, connected to a link. Associated with each adapter is an address (e.g., an IP address), which is used to locate the nodes on the links and to effect communication therebetween. Together, these links and adapters collectively form a network, which may be, for example, an Ethernet or the like. Thus, in FIG. 1, nodes 101, 102 and 104 are coupled to a link via their respective network adapters, and these network adapters together with the link to which they are coupled collectively form network 110. Likewise, networks 120 and 130 are similarly comprised of their respective links and the adapters of nodes 101, 102, 103, and 104.

Figure 8:
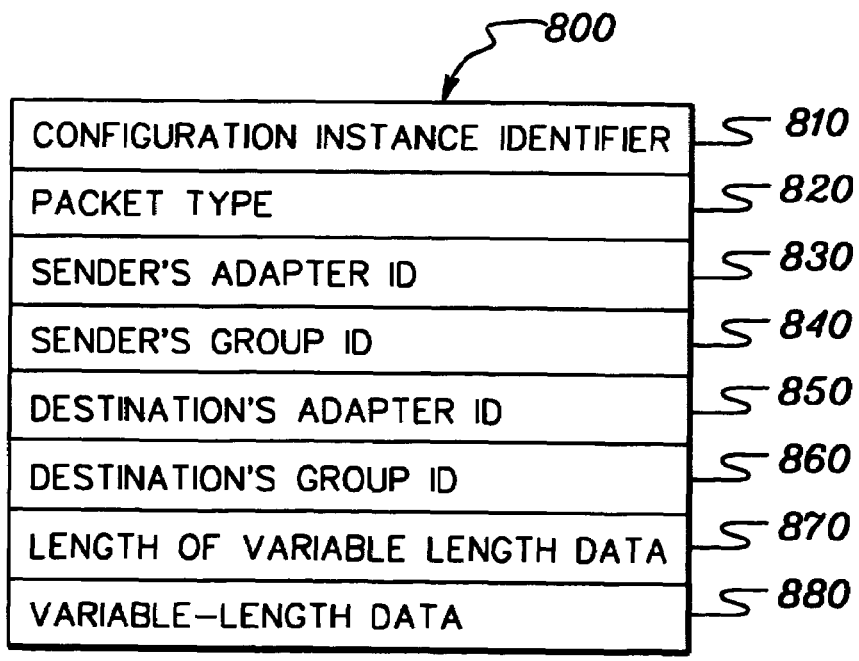
FIG. 8 depicts one example of a packet transmitted by the nodes of FIG. 1, in accordance with the principles of the present invention.

By interconnecting nodes 101, 102, 103, and 104 in this manner, each node is capable of communicating with other nodes through the transmission of packets or messages. One example of a message capable of being transmitted between nodes is depicted in FIG. 8. In particular, FIG. 8 shows the format of a typical message 800 in which data is separated into a number of fields. Each of these fields contains various types of data which are to be transmitted to the other nodes. For instance, the message in FIG. 8 includes: a configuration instance identifier 810; the packet type information 820; the sending adapter identification 830; the sending group identification 840; the destination adapter identification 850; the destination group identification 860; the length of variable length data 870; and the variable length data itself 880.

The status and operation of the nodes in computing system 100 are monitored by a node and network adapter monitoring system. As one example, this system may be Topology Services offered by International Business Machines Corporation. As may be evident from the name of this particular system, these systems are generally used to maintain and disseminate information regarding the topology, or layout, of a computing environment in which it is implemented. For instance, Topology Services is responsible for monitoring events, such as, for example, activation or deactivation of nodes and network adapters. Topology Services informs its client programs about the set of nodes and network adapters in the system that are seen as operational. In addition, Topology Services monitors the addition or removal of nodes, networks, or network adapters and also any changes in the addresses of network adapters. Furthermore, although Topology Services is used in this example for illustrative purposes, it is to be understood that the concepts of the present invention are equally applicable to other similar node and network adapter monitoring systems.

To accomplish its goal of monitoring the nodes of computing system 100, Topology Services runs a process or daemon at each node in computing system 100. Utilizing these daemons, Topology Services is able to run a number of network adapter protocols across each network being monitored.

Figure 2:
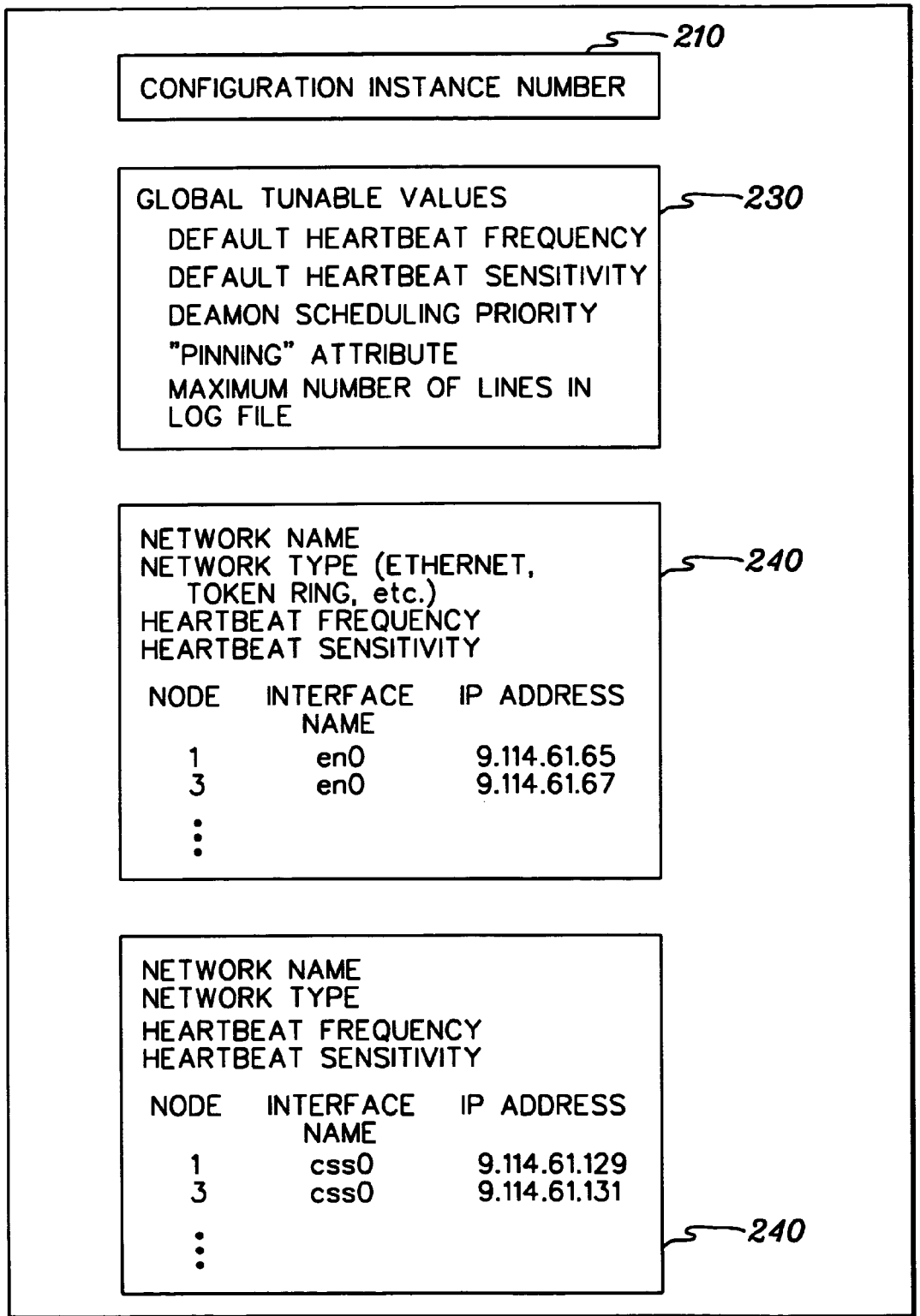
FIG. 2 depicts one example of a configuration file used with the reconfiguring capability of the present invention.

Referring to FIG. 2, Topology Services also makes use of a configuration file 200 which, in one embodiment, is located on a database accessible by each of the nodes in computing system 100. In the alternative, in another embodiment, the configuration file may be located in local memory or a local file of each node. In any event, as shown in FIG. 2, the configuration file contains, for instance, information regarding the configuration of the system, such as an identifier representing a system configuration 210, global tunable values 230, a list of all the adapters in each network and information regarding the network adapter addresses and the like 240.

This configuration file is read by each node at startup or system initialization. In addition to this initial read of the configuration file, each reconfiguration, or change in configuration to the system, also causes each node to read the configuration file. Furthermore, in order to facilitate the dissemination of accurate data, the configuration file is updated, for instance by a system user or at the direction of the system itself, with each modification to the system. As will be discussed below, this configuration file is used in reconfiguring the networks of the system to reflect any changes in topology.

Figure 3:
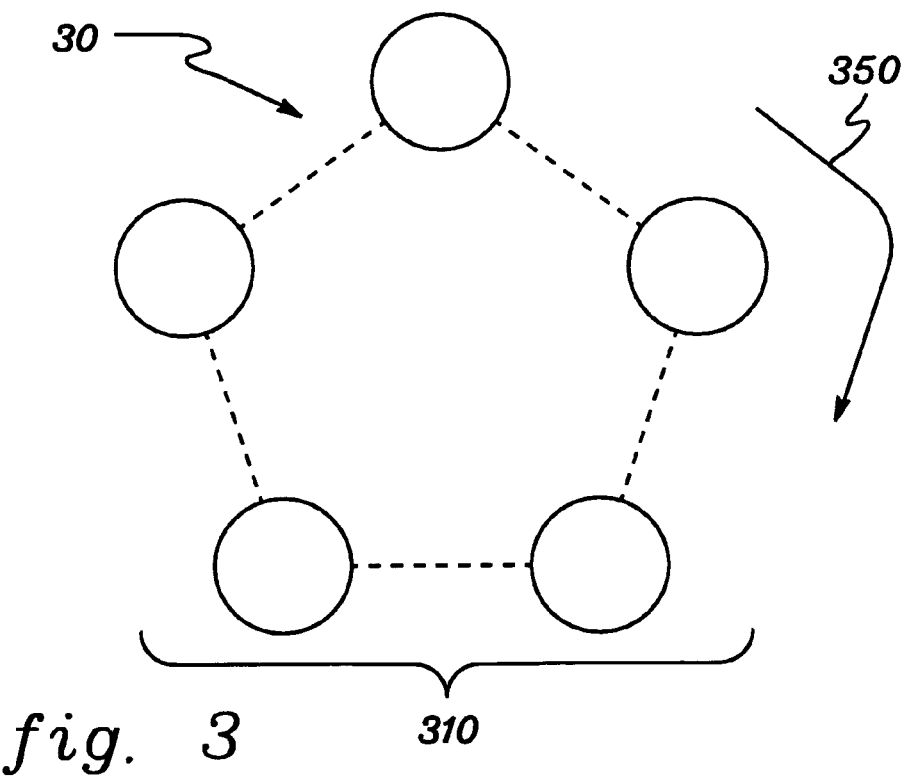
FIG. 3 depicts one example of computing system and transmission of a heartbeat message, in accordance with the principles of the present invention.

Referring to FIG. 3, as one example of a protocol available to Topology Services, a heartbeat protocol is used to identify a set or group of adapters and nodes 310 which are operational or alive in each network. More particularly, each adapter membership group is organized with its members in a virtual ring topology. At predetermined intervals, each node transmits a heartbeat message 350 to a downstream node. This heartbeat message 350 is, in turn, monitored by each of the downstream nodes. In this manner, the cessation of heartbeat messages from a node, beyond a preset number or a predetermined period of time, is recognizable as a node failure by its downstream neighbor.

In FIGS. 4a–4g Topology Services utilizes, as another example, a join protocol to add individual nodes or entire adapter membership groups to an existing membership group. In order to utilize this join protocol, Topology Services first designates a group leader for each membership group. This group leader is a node responsible for coordinating a membership group's protocols and is determined by a predefined adapter priority rule, such as, for instance, using an adapter having the highest IP address.

As an example of the execution of the join protocol, in FIGS. 4a–4g a system 410 includes two individual adapter membership groups 420 and 430. Upon commencement of the join protocol, a group leader GL1 of membership group 420 transmits a proclaim message 450 to all adapters outside the sender's group having a lower IP address, which is ignored by all adapters that are not group leaders. A group leader of membership group 430 receives proclaim message 450, and responds with a join message 460, which contains a membership list of group 430. Thus in FIG. 4b, group leader GL2 transmits a join message 460 containing a list of each of the members of its group to group leader GL1.

Figure 4A:
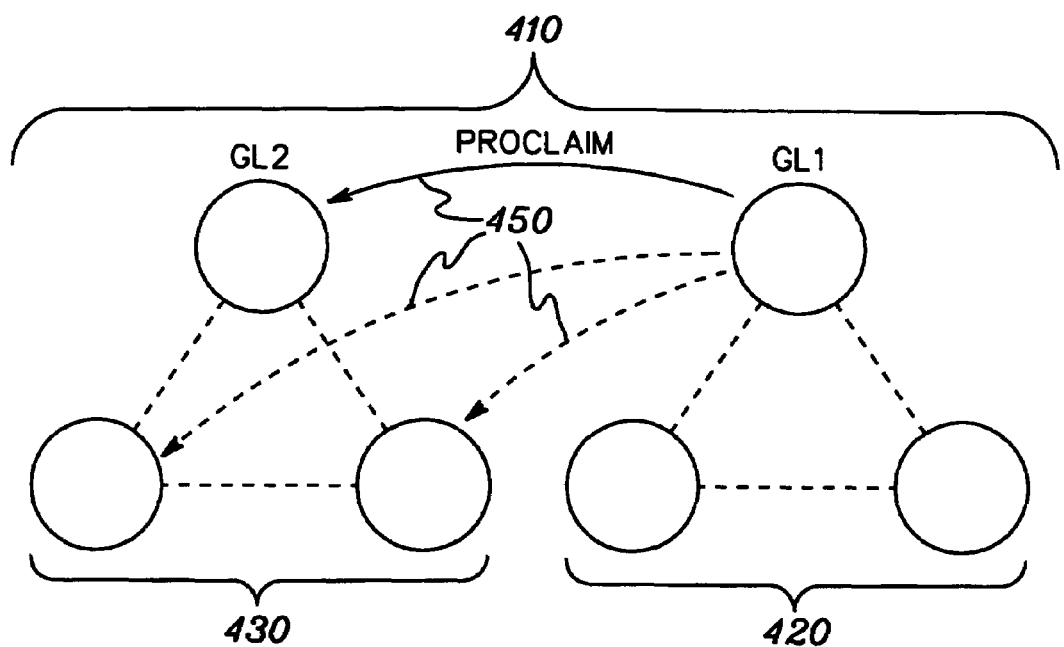
FIGS. 4a–4g depict one example of the execution of a join protocol, in accordance with the principles of the present invention.
Figure 4B:
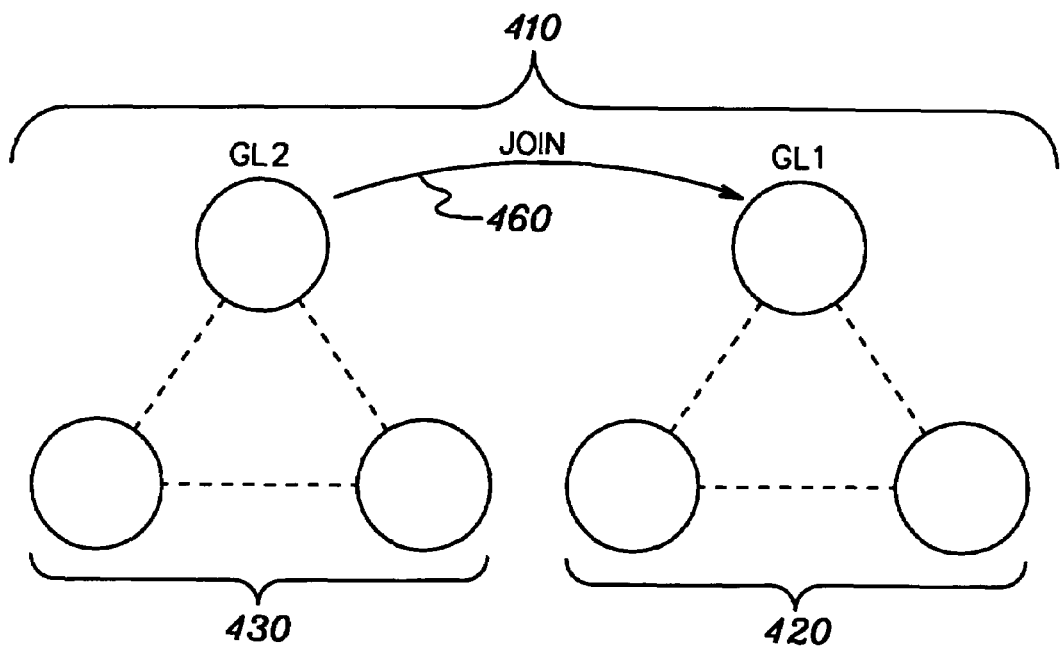
Figure 4C:
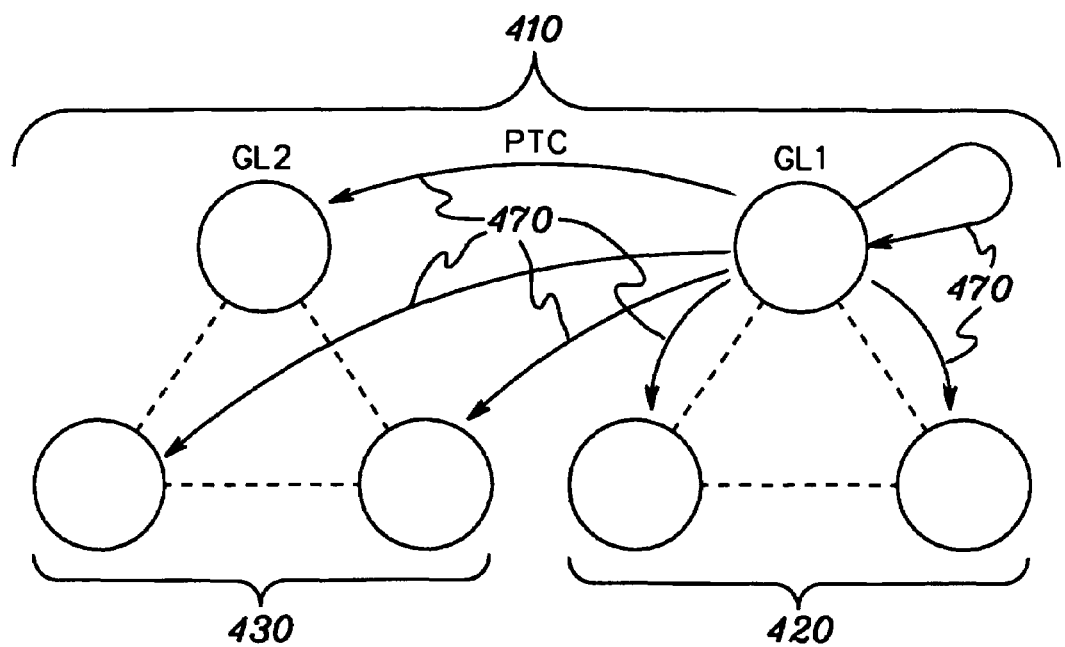
Figure 4D:
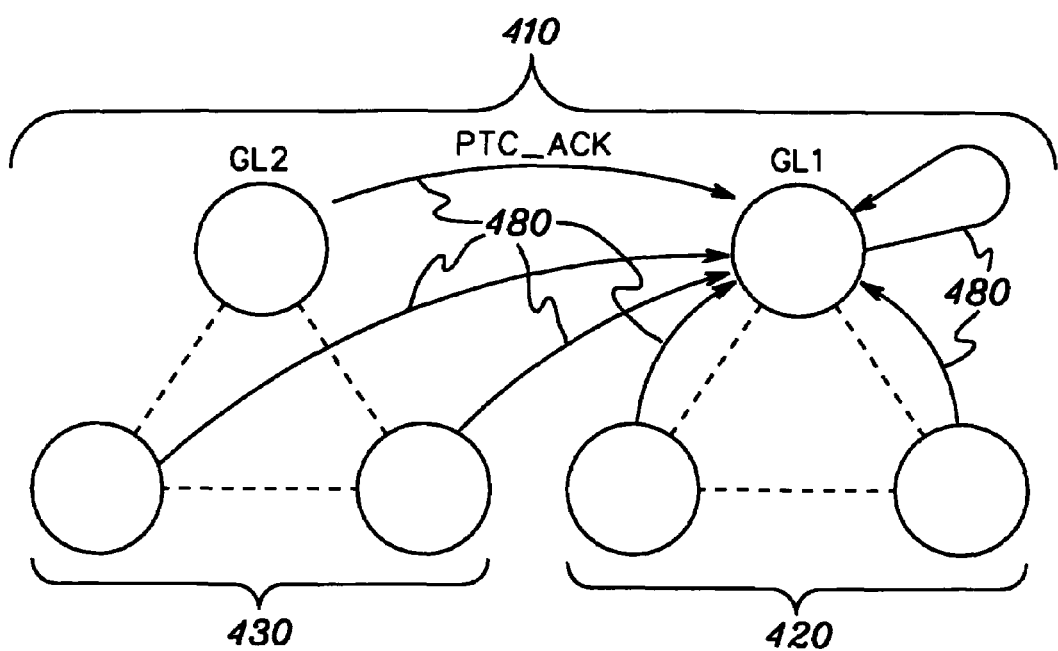

In FIG. 4c, subsequent to receiving join message 460, group leader GL1 transmits a prepare to commit (PTC) message 470 to all of the nodes listed in join message 460 as well as to the members of its own membership group. In response as shown in FIG. 4d, nodes receiving PTC message 470 reply with an acknowledgment or PTC ACK message 480 to group leader GL1. Then, a new group 440 is formed comprising all of the nodes from which a PTC ACK message is received.

Figure 4E:
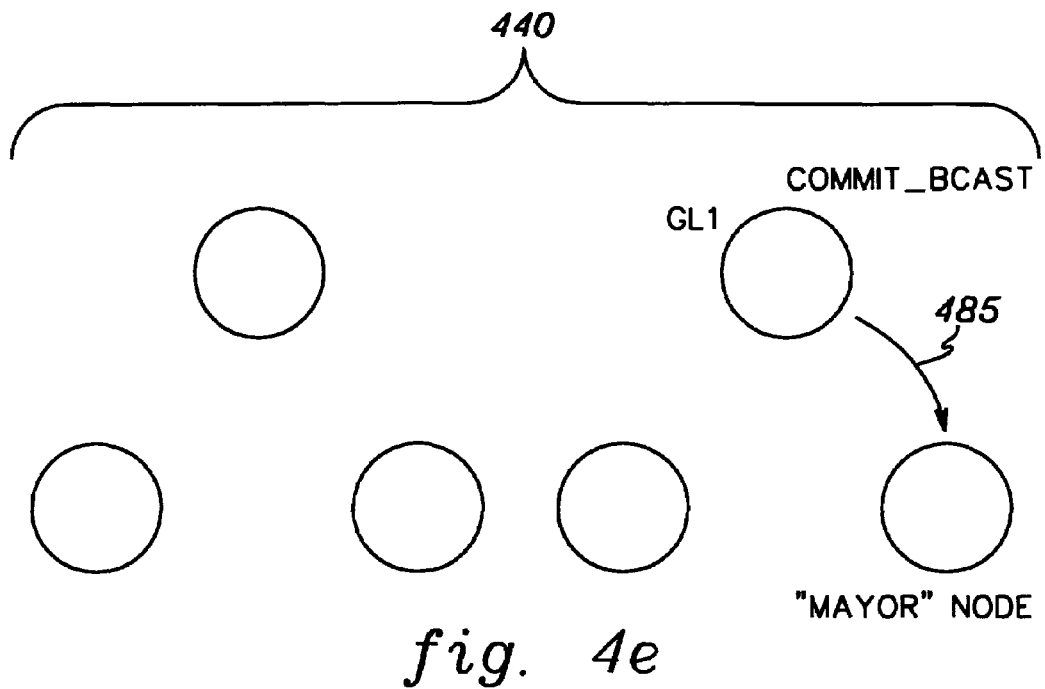
Figure 4F:
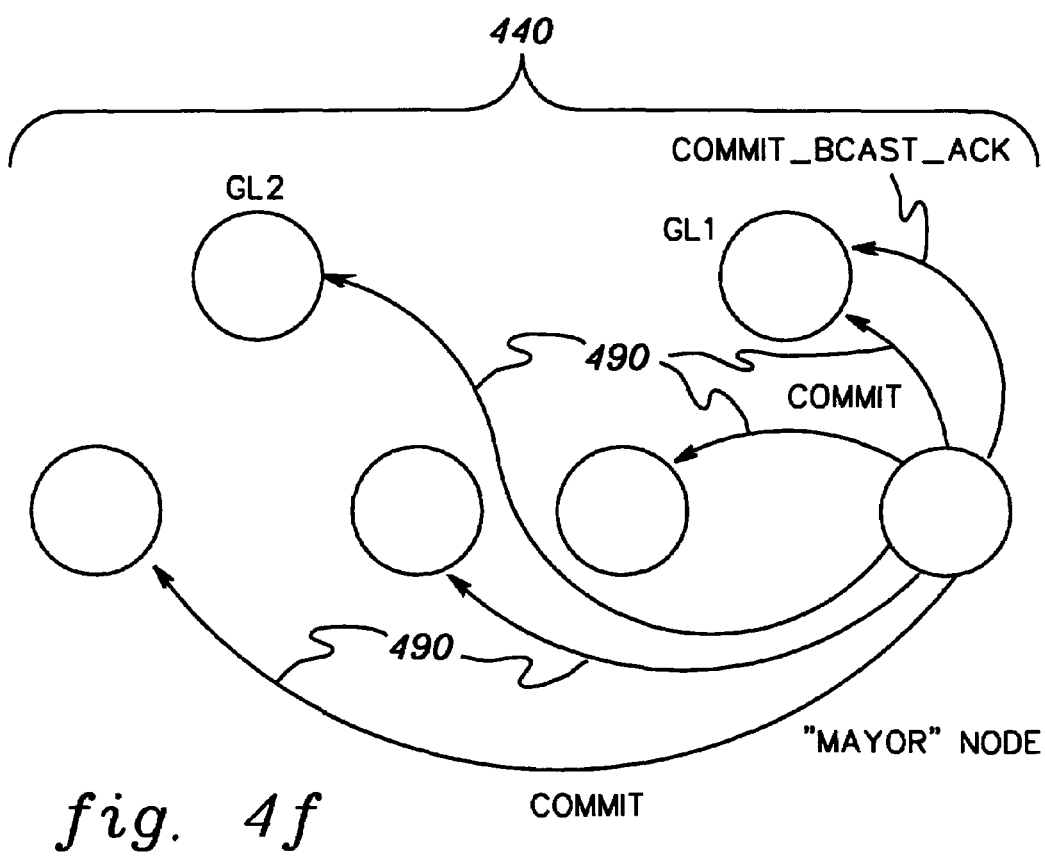

In order to disseminate new group membership information to each of the nodes, in FIG. 4e group leader GL1 transmits a commit broadcast (COMMIT BCAST) message 485 to a number of mayor nodes (determined in a manner similar to the determination of the group leaders). Turning to FIG. 4f, the mayor nodes then transmit commit messages 490 to all members in a subgroup for which each mayor is responsible. By utilizing this two-phase transmission procedure, the speed at which the membership information is disseminated may be increased.

Figure 4G:
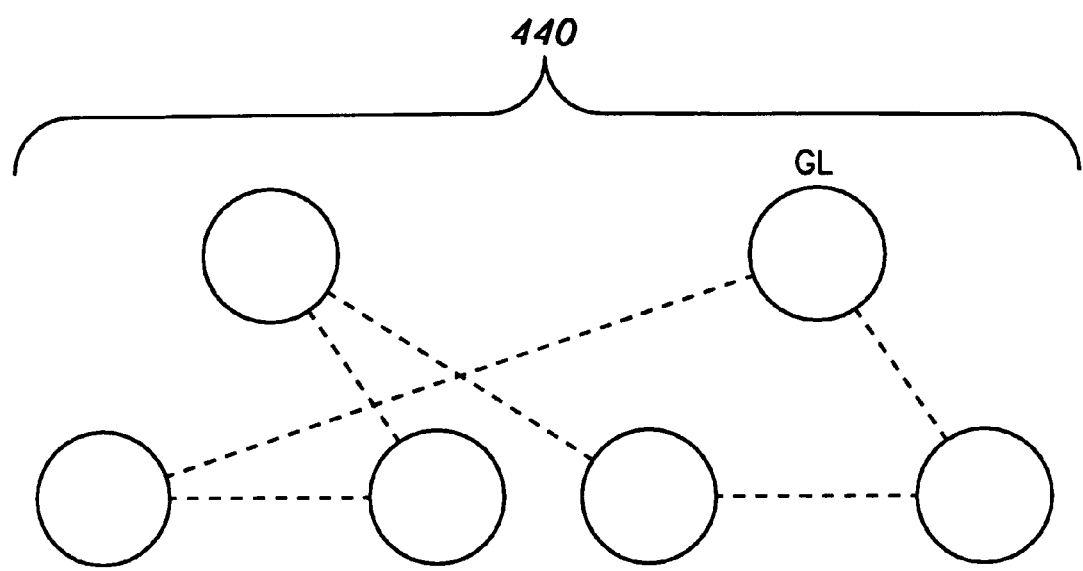

Receipt of the commit message marks the transition from the two individual membership groups to the single newly formed group 440, as depicted in FIG. 4g. At this time, group leader GL1 begins transmitting heartbeat messages as well as proclaim messages, both of which were discussed above.

On a further note, it is altogether possible that a number of the messages utilized by Topology Services' protocols may not reach their intended destination during their first attempts. Thus, many of the messages are transmitted a multiple number of times. For instance, in one embodiment, each of the PTC, commit BCAST, and commit messages are repeatedly transmitted until an acknowledgment is received or until a predetermined number of attempts has been exceeded (i.e., a predetermined number of retries). To illustrate, a PTC message may be transmitted, for example twenty times (i.e., twenty retries) or until an acknowledgment is received. In this manner, the probability of a message reaching its intended destination is increased.

Figure 5:
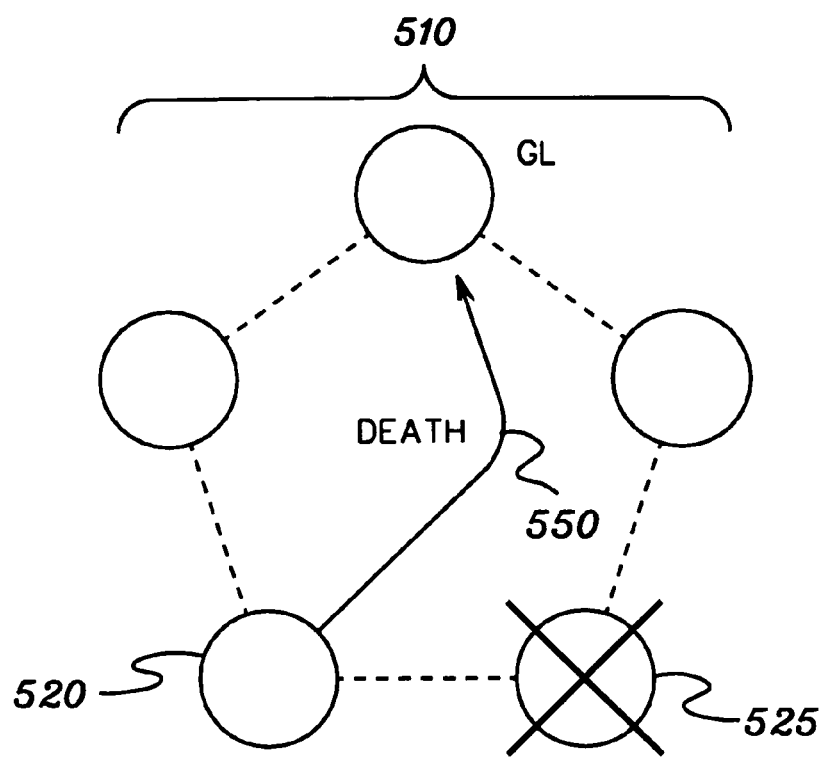
FIG. 5 depicts one example of the execution of a death protocol, in accordance with the principles of the present invention.

As discussed above, each node monitors heartbeat messages to determine whether its upstream neighbor is operational. When a predetermined period of time elapses without the receipt of a heartbeat message (thus signifying that the upstream neighbor is no longer operational), a death protocol is executed. Referring to FIG. 5, after the absence of a period of time in which no heartbeat messages have been received, a node 520 recognizes that its upstream neighbor 525 has died. Node 520 then initiates the death protocol by transmitting a death message 550 to a group leader GL of its membership group 510.

Upon receipt of the death message, group leader GL transmits a PTC message which is followed by the remainder of the join protocol, as discussed above, to form a new group comprising all of the members of the old group except the dead node.

Another example of a protocol available to Topology Services is a node reachability protocol. The node reachability protocol determines a complete set of reachable (or alive) nodes and disseminates this information to each of the nodes of the system. The importance of this feature becomes evident when one realizes that the computing system of the present invention can potentially span several networks thereby requiring communication between some nodes to occur through a sequence of multiple network hops. This particular protocol is implemented through two messages, a node connectivity and a group connectivity message, which are discussed in greater detail below.

Figure 6A:
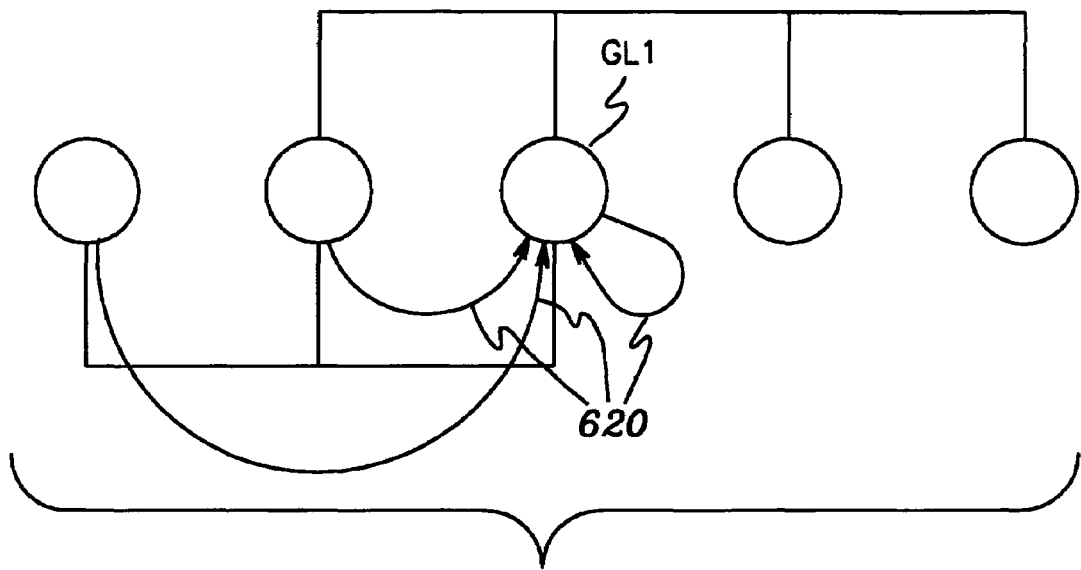
FIGS. 6a–6b depict one example of the execution of a node reachability protocol, in accordance with the principles of the present invention.
Figure 6B:
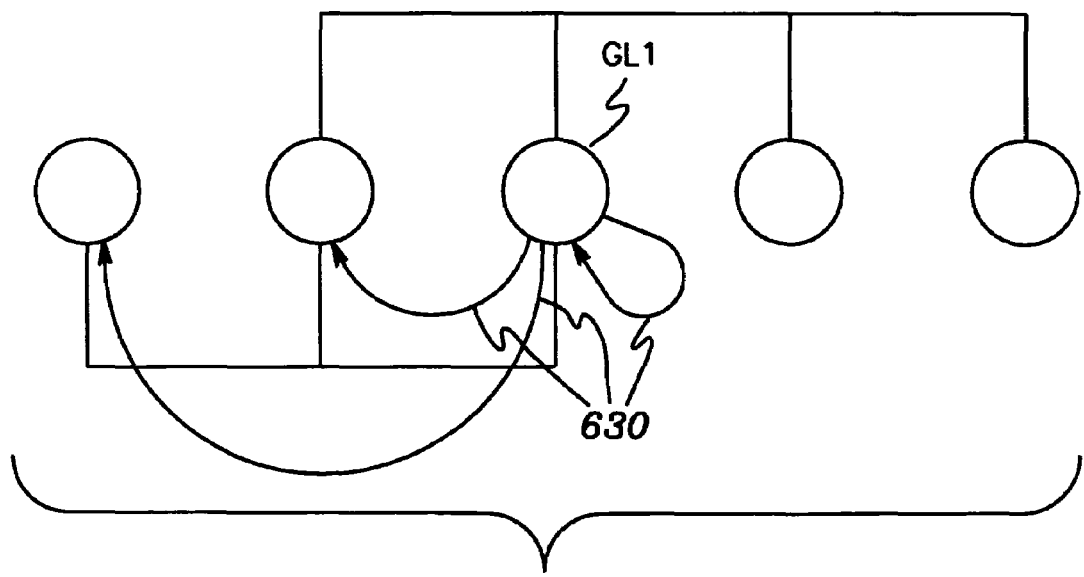

Referring to FIG. 6a, a node connectivity message 620 is sent from each node in a membership group to the group's group leader GL1. These node connectivity messages contain information regarding the networks to which the sending node is connected, or in other words information regarding all of the other membership groups to which the sending node belongs. Subsequently, group leader GL1 stores this information in local memory and responds with the transmission of a group connectivity message 630 to all of the members of its group (see, FIG. 6b). In contrast to the information contained in the node connectivity message, the group connectivity message contains aggregate information collected from all of the node connectivity messages received from the group members. Furthermore, to ensure that the group connectivity message information is disseminated to all of the nodes of the system, each node then forwards the group connectivity message to all nodes that are reachable via networks other than the network from which the message was initially received. In this manner, each node is made aware of all of the reachable nodes of the system.

In accordance with one aspect of the present invention, a reconfiguration protocol is provided for implementing configuration changes to the system. These configuration changes, or reconfigurations, are implemented in each node to reflect changes in the topology of the system. Thus, for example, reconfiguration occurs with the addition or removal of computing resources, such as, for instance, a single node or an entire network of nodes, to the existing system or with, for example, a change in the address or addition or removal of an adapter. Furthermore, since reconfiguration may be necessitated at any time, even in the middle of an executing protocol, the reconfiguration should be made with minimal disturbance to the system and also without interruption to executing protocols.

To implement this particular protocol, information relating to the topology of the configuration, as well as a configuration identifier representing the configuration of the system, is written to the configuration file of FIG. 2 with each event that changes the configuration of the system. As discussed above, this configuration file is then read by each node at the commencement of reconfiguration. After reading the configuration file, each node stores this information to local memory. The configuration identifier is then utilized to trigger reconfiguration, as discussed in greater detail below.

Figure 9:
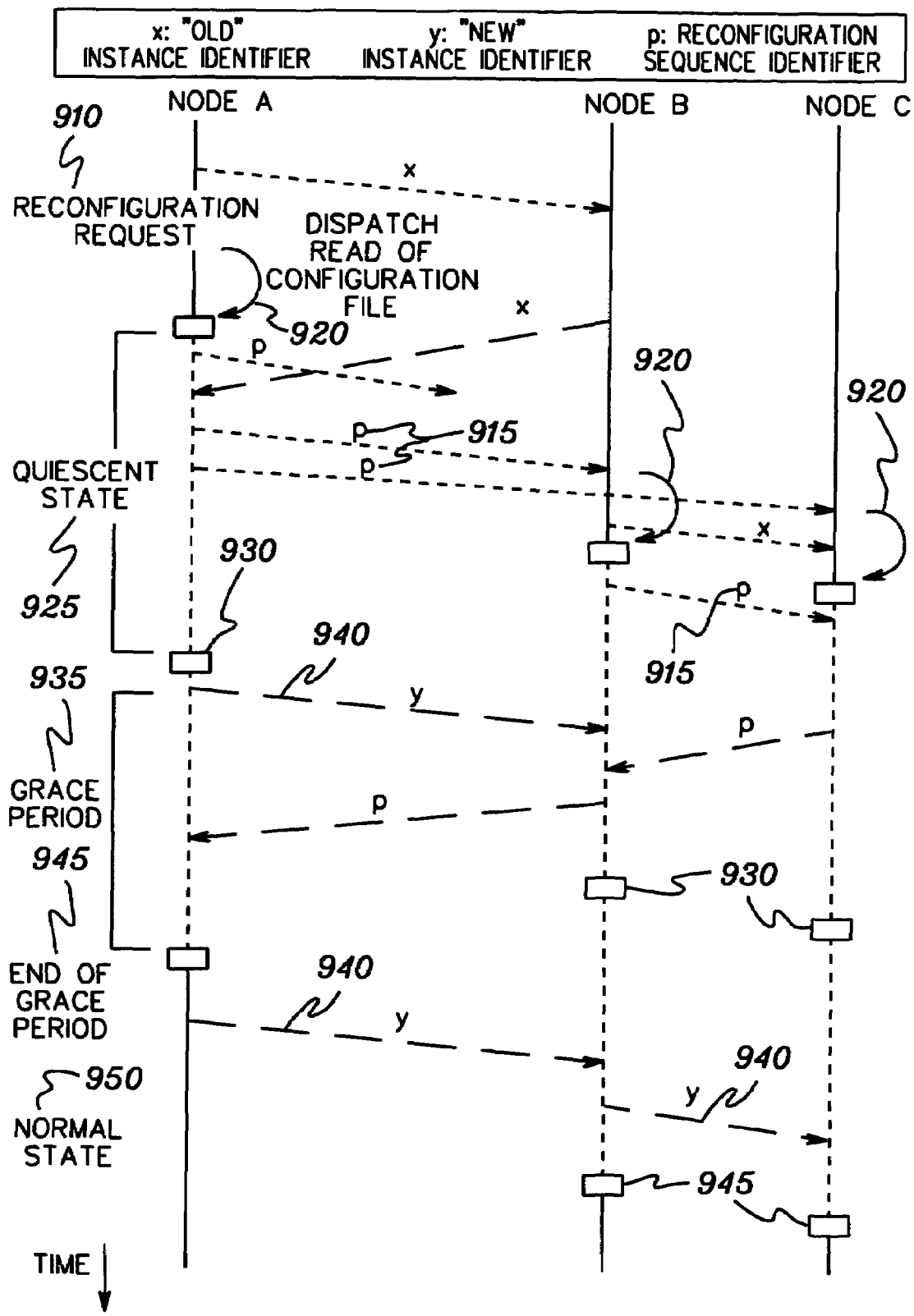
FIG. 9 depicts one example of a time line illustrating the operation of the system of FIG. 1, in accordance with the principles of the present invention.
Figure 10A:
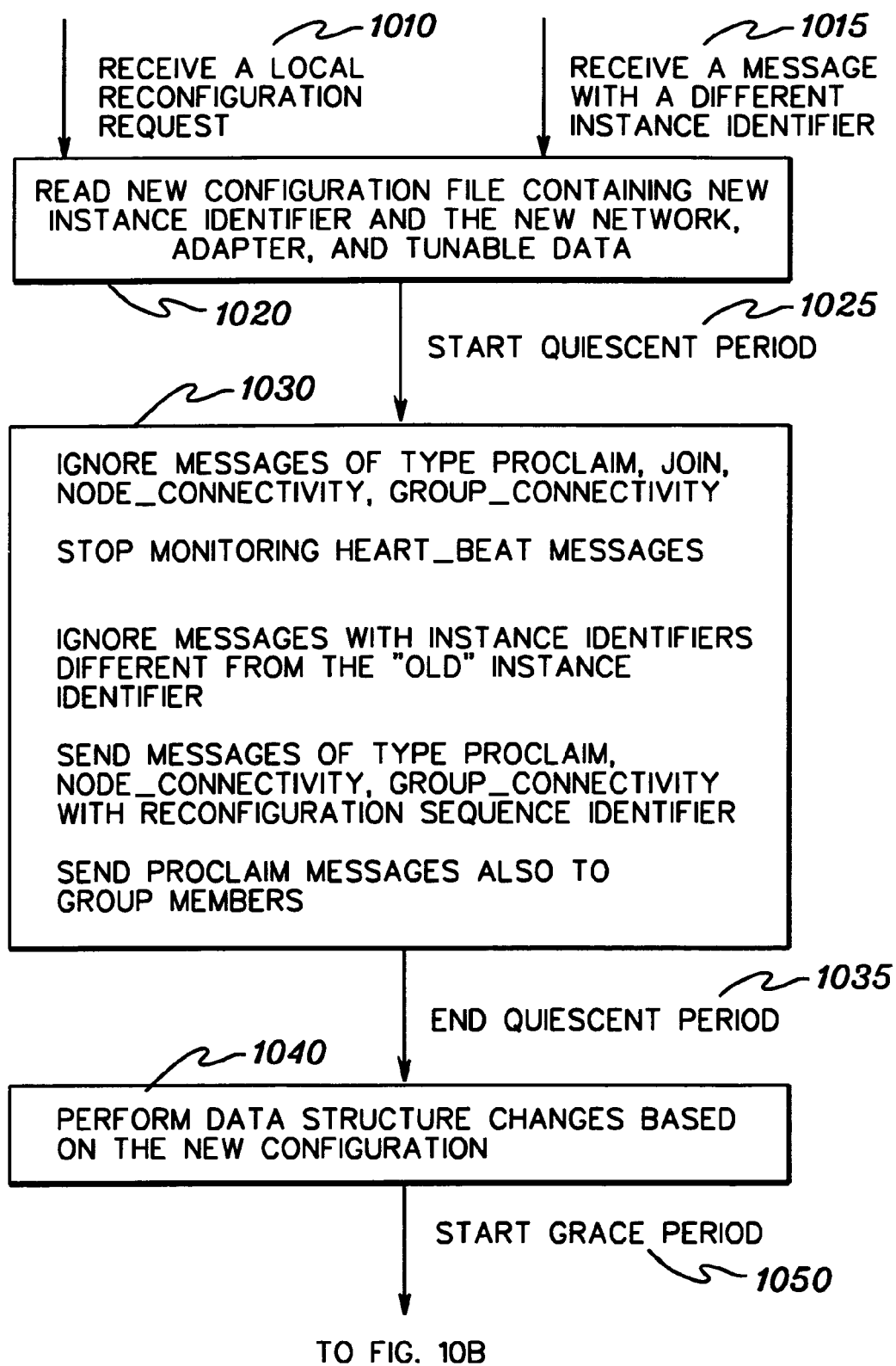
FIGS. 10a–10b depict one example of a flow diagram associated with the reconfiguration capability of the present invention.
Figure 10B:
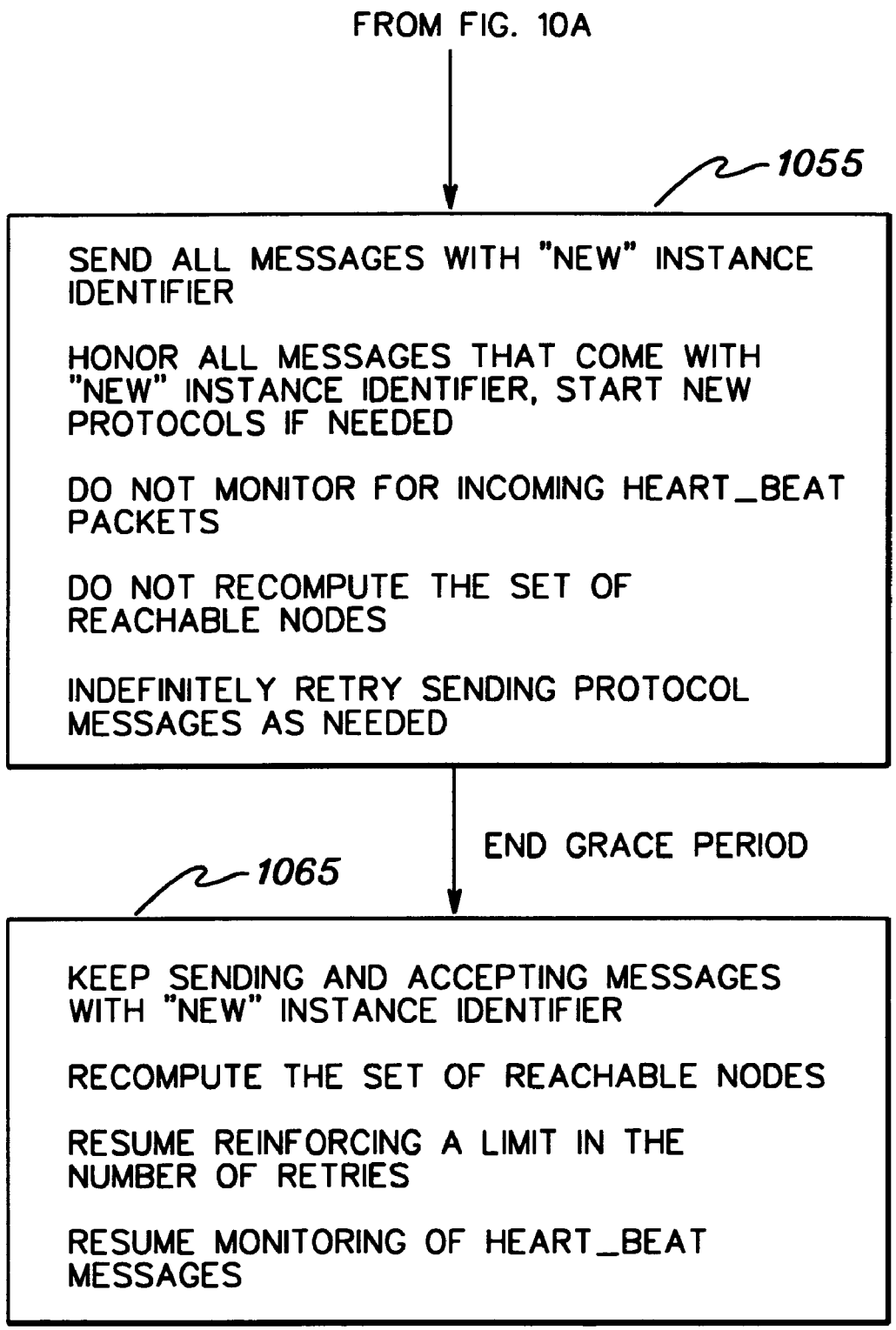

Referring to FIGS. 9 and 10, reconfiguration is typically initiated by a user, locally, at a particular node, 910 and 1010. As part of a user initiated reconfiguration, new configuration information, including a new configuration identifier is stored to the configuration file. In addition, reconfiguration at a particular node may be triggered by the receipt of a message having a reconfiguration sequence identifier (e.g., a number equal to the maximum possible value of the system) 915 and 1015. In any event, the node that receives the reconfiguration request (from either a user or in the form of a message) responds by reading the configuration file containing the new configuration information, 920 and 1020, and stores this new information to local memory. However, instead of immediately implementing the configuration changes, the node enters a quiescent state for a predetermined period of time, 925 and 1025.

In particular, each node remains in a quiescent state for a period of time sufficient to allow currently running protocols to complete execution under the previous configuration. In addition, the quiescent state is set to allow the propagation of messages containing a reconfiguration sequence identifier to the other nodes of the system, and thus trigger reconfiguration in those other nodes as well, 915 and 1015. Therefore, before the quiescent state terminates at an individual node, all currently running protocols (e.g., death or join protocols) will have completed execution, and all of the other nodes in the system will have received a reconfiguration request and thus will have also entered their own respective quiescent states. Hence, by using a predetermined period of time, each node may terminate its quiescent state without any express communication or acknowledgment from any other nodes.

As discussed above, upon receiving a reconfiguration request, each node enters a quiescent state for a predetermined period of time sufficient to allow currently running protocols to complete execution under the previous configuration.

Specifically, each protocol is set so that execution completes after a limited amount of retries are performed with a set period of time between retries. To use the join protocol as an example, a group leader attempting to have a new node commit will transmit only a limited amount of PTC messages, for example, twenty, with, for example, three seconds between the transmission of each PTC message. Thus, in this example, assuming that the join protocol is the lengthiest protocol utilized by the system, the predetermined period of the quiescent state is set to cover, at least, 60 seconds (20 retries×3 seconds between each retry).

Furthermore, while in this quiescent state, each node also propagates reconfiguration requests to the other nodes of the system (see, 915 and 1030). In accordance with the principles of the invention, the system utilizes a slightly modified message belonging to another protocol to facilitate the propagation of these reconfiguration requests. More specifically, messages such as, for instance, proclaim, node connectivity, or group connectivity messages are modified to include the aforementioned reconfiguration sequence identifier (e.g., a number equal to the maximum possible value of the system). Additionally, in other embodiments, the frequency of transmission of some messages may be increased to further increase the rate of propagation. Then, upon receipt of these messages by the other nodes of the system, reconfiguration is triggered in those other nodes as well (see, 1015).

To ensure that new configurations are not observed before the other nodes of the system have had an opportunity to initiate reconfiguration, nodes in their quiescent states do not process messages with sequence identifiers different from the sequence identifier currently stored in local memory. In addition, some protocol messages are ignored during the quiescent state to prevent new protocols from executing. When the quiescent state ends and data structures are modified, no protocols are executing which makes the data structure changes much simpler and safer. For instance, proclaim, join, node connectivity, and group connectivity messages are all ignored during the quiescent state. Heartbeat messages are also not monitored so that nodes which have temporarily stopped transmitting heartbeats are not mistakenly considered not operational. Furthermore, messages of not yet completed protocols are transmitted with the previous configuration identifier and not with the reconfiguration sequence identifier. Heartbeat messages, on the other hand, are transmitted with the reconfiguration sequence identifier to help propagate the reconfiguration request. However, the heartbeat message is nevertheless accepted even when the sequence identifier does not match that of the receiver.

After the quiescent state has terminated 1035, as dictated by the period of time required for all of the executing protocols to terminate and for reconfiguration requests to be propagated to the other nodes of the system, each node implements the new configuration read from the configuration file, by performing data structure changes to reflect the change in topology, 930 and 1040. Subsequently, each node enters a grace period, 935 and 1050, as discussed below.

Because nodes of the system typically do not enter their quiescent states at the same time, the aforementioned grace period is used to allow all nodes to exit their quiescent states before any nodes resume normal operation. In this regard, the grace period, in one example, is equal to the length of the quiescent state. Furthermore, during the grace period, each node transmits messages with the new configuration identifier 940, begins honoring messages with the new configuration identifier (and initiating any new protocols as a result of these messages), and transmits protocol messages that normally have a limited amount of retries throughout the entire grace period 1055. Additionally, messages having configuration numbers different from the new configuration number are ignored and heartbeat messages are not monitored, and no computation is made of the set of reachable nodes 1055.

Subsequently, after a period of time equal to the duration of the grace period has elapsed 945, normal operation is resumed (i.e., the set of reachable nodes is computed, any limits to the maximum number of retries is again enforced, and the monitoring of heartbeat messages is commenced, 950 and 1065).

Figure 7:
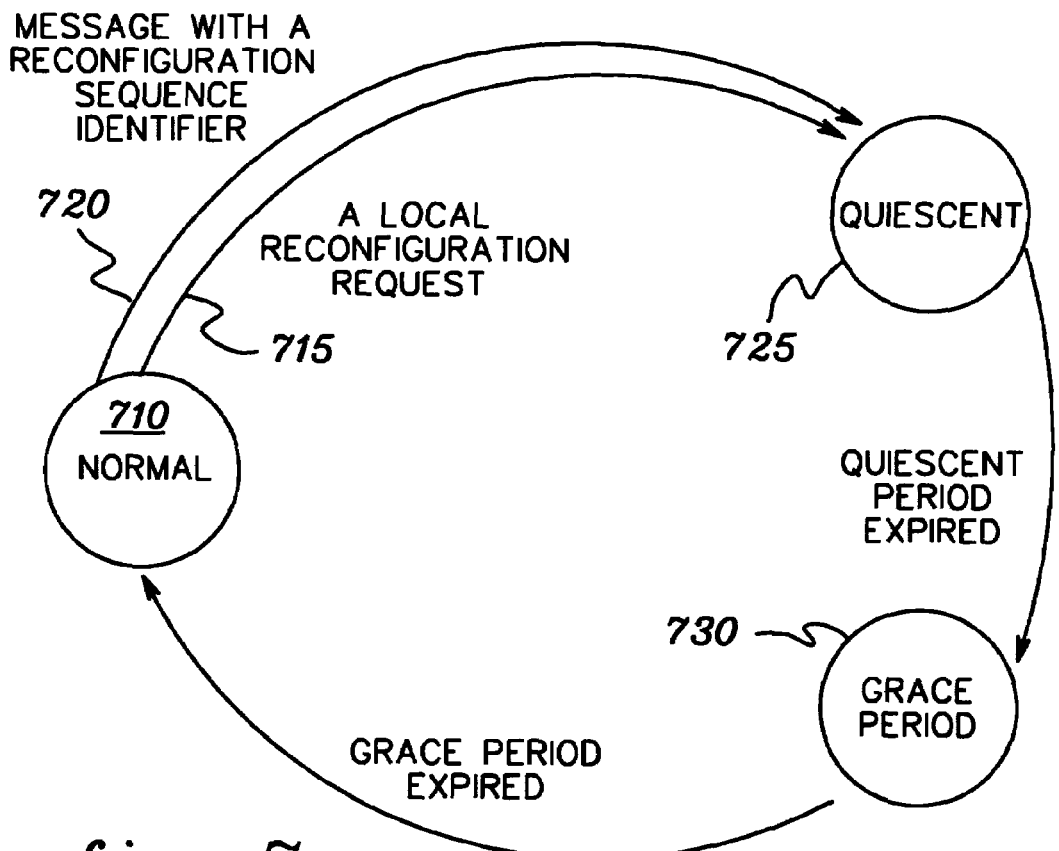
FIG. 7 depicts one example of a state diagram of a node of FIG. 1, in accordance with the principles of the present invention.

Referring to FIG. 7, a state diagram of a particular node is depicted. As can be seen, a local reconfiguration request 715 or a message with a reconfiguration sequence identifier 720 causes the node to exit a normal operational state 710 and enter a quiescent state 725. Then, after termination of the quiescent state, the node enters a grace period 730. Similarly, after termination of the grace period, the node returns to normal operation 710.

Although reconfiguration requests are shown as being triggered by messages having a reconfiguration sequence identifier, it is also possible for reconfiguration to be triggered by a message having a sequence identifier differing from that which is stored in the receiving node. In this case, a node may be deactivated when reconfiguration occurs in the other nodes. Then, when the node is later reactivated, it will initially start operating with the old configuration, only to be reconfigured upon the receipt of a message having a different or new sequence identifier.

Thus, presented herein is a reconfiguration capability which advantageously enables a network having a plurality of nodes to be reconfigured to reflect a change in topology of the network by utilizing a predetermined length quiescent state. This predetermined period of time is sufficient to allow the transmission of reconfiguration requests from one node to other nodes of the network thereby causing the other nodes to also enter quiescent states. In another embodiment, this predetermined period of time is sufficient for protocols currently running on the network to complete execution. By utilizing this predetermined period of time, each node is able to exit from or terminate its quiescent state without having to check with or receive any communication from the other nodes of the network. Consequently, currently executing protocols are not interrupted and global synchronization is not required.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of reconfiguring a network having a plurality of nodes to reflect a change in topology of said network, said method comprising:
    upon receiving a reconfiguration request at one node of said plurality of nodes, entering a quiescent state at said one node, wherein said one node remains in said quiescent state for a predetermined period of time sufficient to allow at least one other node of said plurality of nodes to also enter a quiescent state; and
    upon termination of said quiescent state at said one node, reconfiguring said one node to reflect said change in topology of said network without checking with said at least one other node.

2. The method of claim 1, wherein said predetermined period of time comprises an amount of time sufficient to transmit a reconfiguration request from said one node to said at least one other node, wherein receipt of said reconfiguration request causes said at least one other node to enter a quiescent state.

3. The method of claim 1, wherein said predetermined period of time comprises an amount of time sufficient for protocols currently running on said network to complete execution.

4. The method of claim 3, wherein said protocols comprise one of a heart beat, join, death, or node reachability protocol.

5. The method of claim 1, wherein said predetermined period of time comprises an amount of time sufficient for a protocol currently running on said network to perform a predetermined number of retries plus a predetermined amount of time between each retry, wherein after attempting said predetermined number of retries, said protocol completes execution.

6. The method of claim 5, wherein said protocol comprises one of a heart beat, join, death, or node reachability protocol.

7. The method of claim 1, wherein said reconfiguring said one node occurs without any communication to said node from said at least one other node of said plurality of nodes.

8. The method of claim 1, wherein said reconfiguring said one node comprises refraining from observing said change in topology at said one node during a grace period, wherein said grace period comprises a predetermined period of time sufficient to allow said at least one other node of said plurality of nodes to exit a quiescent state, and upon termination of said grace period, observing said change in topology at said one node.

9. The method of claim 1, wherein said reconfiguration request results from addition or removal of a node or of at least one other network to said network.

10. The method of claim 1, where said reconfiguration request results from a change in address of a node of said network.

11. The method of claim 1, wherein said network is reconfigured without interrupting currently executing protocols.

12. The method of claim 1, wherein said network is reconfigured without a global synchronization protocol.

13. The method of claim 1, further comprising transmitting, upon entering said quiescent state, a reconfiguration request from said one node to said at least one other node, wherein receipt of said reconfiguration request causes said at least one other node to enter a quiescent state.

14. The method of claim 13, wherein said reconfiguration request comprises one of a message having a reconfiguration sequence identifier and a message having a configuration sequence identifier different from a configuration identifier of said one node.

15. The method of claim 1, wherein said network comprises a plurality of interconnected computing networks together implementing a distributed node and adapter status monitoring system.

16. The method of claim 1, further comprising preventing, by said node when in said quiescent state, execution of new protocols by ignoring proclaim, join, node connectivity, and group connectivity messages and by no longer monitoring heartbeat messages.

17. The method of claim 1, further comprising transmitting, by said node when in said quiescent state, proclaim, heartbeat, node connectivity, and group connectivity messages with a reconfiguration sequence identifier to propagate reconfiguration requests to said at least one other node.

18. A system for reconfiguring a network having a plurality of nodes to reflect a change in topology of said network, said system comprising:
    means for entering, upon receiving a reconfiguration request at one node of said plurality of nodes, a quiescent state at said one node, wherein said one node remains in said quiescent state for a predetermined period of time sufficient to allow at least one other node of said plurality of nodes to also enter a quiescent state; and
    means for reconfiguring, upon termination of said quiescent state at said one node, said one node to reflect said change in topology of said network without checking with said at least one other node.

19. The system of claim 18, wherein said predetermined period of time comprises an amount of time sufficient to transmit a reconfiguration request from said one node to said at least one other node, wherein receipt of said reconfiguration request causes said at least one other node to enter a quiescent state.

20. The system of claim 18, wherein said predetermined period of time comprises an amount of time sufficient for protocols currently running on said network to complete execution.

21. The system of claim 20, wherein said protocols comprise one of a heart beat, join, death, or node reachability protocol.

22. The system of claim 18, wherein said predetermined period of time comprises an amount of time sufficient for a protocol currently running on said network to perform a predetermined number of retries plus a predetermined amount of time between each retry, wherein after attempting said predetermined number of retries, said protocol completes execution.

23. The system of claim 22, wherein said protocol comprises one of a heart beat, join, death, or node reachability protocol.

24. The system of claim 18, wherein said means for reconfiguring said one node reconfigures without any communication to said node from said at least one other node of said plurality of nodes.

25. The system of claim 18, wherein said means for reconfiguring said one node comprises means for refraining from observing said change in topology at said one node during a grace period, wherein said grace period comprises a predetermined period of time sufficient to allow said at least one other node of said plurality of nodes to exit a quiescent state, and upon termination of said grace period, for observing said change in topology at said one node.

26. The system of claim 18, wherein said reconfiguration request results from addition or removal of a node or of at least one other network to said network.

27. The system of claim 18, where said reconfiguration request results from a change in address of a node of said network.

28. The system of claim 18, wherein said network is reconfigured without interrupting currently executing protocols.

29. The system of claim 18, wherein said network is reconfigured without a global synchronization protocol.

30. The system of claim 18, further comprising means for transmitting, upon entering said quiescent state, a reconfiguration request from said one node to said at least one other node, wherein receipt of said reconfiguration request causes said at least one other node to enter a quiescent state.

31. The system of claim 30, wherein said reconfiguration request comprises one of a message having a reconfiguration sequence identifier or a message having a configuration sequence identifier different from a configuration identifier of said one node.

32. The system of claim 18, wherein said network comprises a plurality of interconnected computing networks together implementing a distributed node and adapter status monitoring system.

33. The system of claim 18, further comprising means for preventing, by said node when in said quiescent state, execution of new protocols by ignoring proclaim, join, node connectivity, and group connectivity messages and by no longer monitoring heartbeat messages.

34. The system of claim 18, further comprising means for transmitting, by said node when in said quiescent state, proclaim, heartbeat, node connectivity, and group connectivity messages with a reconfiguration sequence identifier to propagate reconfiguration requests to said at least one other node.

35. A system for reconfiguring a network having a plurality of nodes to reflect a change in topology of said network, said system comprising:
    a computing node capable of entering, upon receiving a reconfiguration request at one node of said plurality of nodes, a quiescent state at said one node, wherein said one node remains in said quiescent state for a predetermined period of time sufficient to allow at least one other node of said plurality of nodes to also enter a quiescent state; said computing node further being capable of reconfiguring, upon termination of said quiescent state at said one node, said one node to reflect said change in topology of said network without checking with said at least one other node.

36. An article of manufacture comprising:
    a computer useable medium having computer readable program code means embodied therein for reconfiguring a network having a plurality of nodes to reflect a change in topology of said network, said article of manufacturing comprising:
    computer readable program code means for entering, upon receiving a reconfiguration request at one node of said plurality of nodes, a quiescent state at said one node, wherein said one node remains in said quiescent state for a predetermined period of time sufficient to allow at least one other node of said plurality of nodes to also enter a quiescent state; and
    computer readable program code means for reconfiguring, upon termination of said quiescent state at said one node, said one node to reflect said change in topology of said network without checking with said at least one other node.

37. The article of manufacturing of claim 36, wherein said predetermined period of time comprises an amount of time sufficient to transmit a reconfiguration request from said one node to said at least one other node, wherein receipt of said reconfiguration request causes said at least one other node to enter a quiescent state.

38. The article of manufacturing of claim 36, wherein said predetermined period of time comprises an amount of time sufficient for protocols currently running on said network to complete execution.

39. The article of manufacturing of claim 38, wherein said protocols comprise one of a heart beat, join, death, or node reachability protocol.

40. The article of manufacturing of claim 36, wherein said predetermined period of time comprises an amount of time sufficient for a protocol currently running on said network to perform a predetermined number of retries plus a predetermined amount of time between each retry, wherein after attempting said predetermined number of retries, said protocol completes execution.

41. The article of manufacturing of claim 40, wherein said protocol comprises one of a heart beat, join, death, or node reachability protocol.

42. The article of manufacturing of claim 36, wherein said computer readable program code means for reconfiguring said one node reconfigures without any communication to said node from said at least one other node of said plurality of nodes.

43. The article of manufacturing of claim 36, wherein said computer readable program code means for reconfiguring said one node comprises computer readable program code means for refraining from observing said change in topology at said one node during a grace period, wherein said grace period comprises a predetermined period of time sufficient to allow said at least one other node of said plurality of nodes to exit a quiescent state, and upon termination of said grace period, for observing said change in topology at said one node.

44. The article of manufacturing of claim 36, wherein said reconfiguration request results from addition or removal of a node or of at least one other network to said network.

45. The article of manufacturing of claim 36, where said reconfiguration request results from a change in address of a node of said network.

46. The article of manufacturing of claim 36, wherein said network is reconfigured without interrupting currently executing protocols.

47. The article of manufacturing of claim 36, wherein said network is reconfigured without a global synchronization protocol.

48. The article of manufacturing of claim 36, further comprising computer readable program code means for transmitting, upon entering said quiescent state, a reconfiguration request from said one node to said at least one other node, wherein receipt of said reconfiguration request causes said at least one other node to enter a quiescent state.

49. The article of manufacturing of claim 48, wherein said reconfiguration request comprises one of a message having a reconfiguration sequence identifier and a message having a configuration sequence identifier different from a configuration identifier of said one node.

50. The article of manufacturing of claim 36, wherein said network comprises a plurality of interconnected computing networks together implementing a distributed node and adapter status monitoring system.

51. The article of manufacturing of claim 36, further comprising computer readable program code means for preventing, by said node when in said quiescent state, the execution of new protocols by ignoring proclaim, join, node connectivity, and group connectivity messages and by no longer monitoring heartbeat messages.

52. The article of manufacturing of claim 36, further comprising computer readable program code means for transmitting, by said node when in said quiescent state, proclaim, heartbeat, node connectivity, and group connectivity messages with a reconfiguration sequence identifier to propagate reconfiguration requests to said at least one other node.

* * * * *